No. 764,720. PATENTED JULY 12, 1904.
R. H. GRAY.
STEAM COOKER.
APPLICATION FILED JUNE 30, 1903.
NO MODEL.
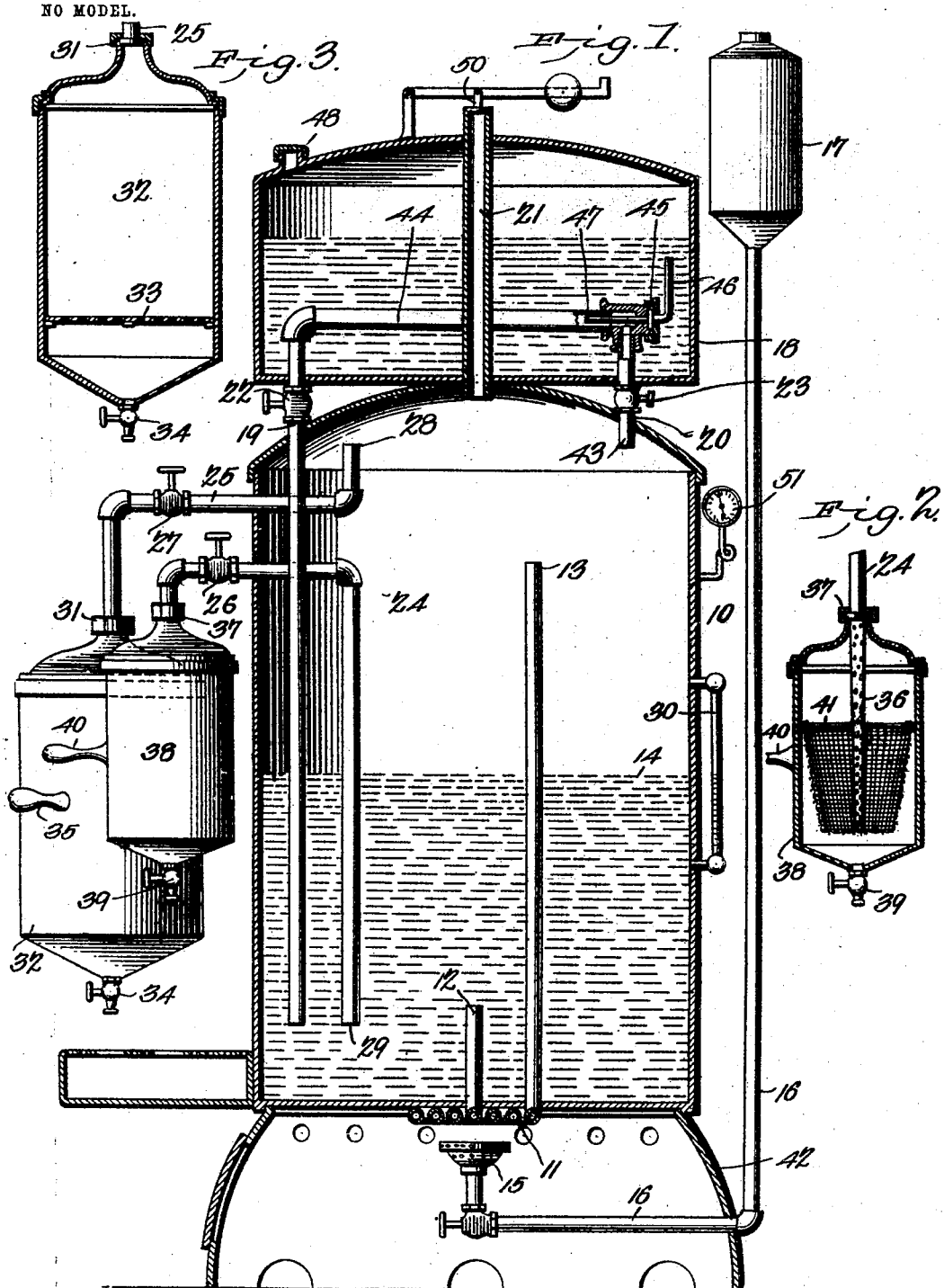

No. 764,720.

Patented July 12, 1904.

UNITED STATES PATENT OFFICE.

ROBERT H. GRAY, OF LEXINGTON, KENTUCKY.

STEAM-COOKER.

SPECIFICATION forming part of Letters Patent No. 764,720, dated July 12, 1904.

Application filed June 30, 1903. Serial No. 163,781. (No model.)

*To all whom it may concern:*

Be it known that I, ROBERT H. GRAY, a citizen of the United States, residing at Lexington, in the county of Fayette and State of Kentucky, have invented a new and useful Steam-Cooker, of which the following is a specification.

This invention relates to apparatus employed for cooking by steam or hot water and for rapidly heating water for various purposes, and has for its object to simplify and improve devices of this character which may be employed for cooking various forms of food, making tea or coffee, or heating water for any desired purpose; and the invention consists in certain novel features of construction, as hereinafter shown and described, and specified in the claims following.

In the drawings illustrative of the invention, in which corresponding parts are denoted by like designating characters, Figure 1 is a sectional elevation of the apparatus complete. Fig. 2 is a longitudinal sectional elevation of the coffee-making portion, and Fig. 3 is a similar view of the steam cooking portion of the apparatus detached.

The improved apparatus comprises a generator (indicated as a whole at 10) having a tubular coil 11 below it, with the ends extending through the bottom of the generator, one end terminating at 12 below the water-line and the other end terminating at 13 above the water-line, as shown, the water-line being indicated at 14. The generator portion will be provided with a water-gage 30 of the usual construction. Any approved heating medium may be employed to heat the coil; but generally a hydrocarbon-burner 15 of any approved form supplied through a conduit 16 from a tank 17 will be used in the usual manner. By this simple arrangement it will be obvious that heat applied to the coil 11 will cause the water to rise and flow from the pipe 13, and its place will be supplied by the cooler water flowing in through the pipe 12, thus creating and maintaining a rapid circulation of the water in the generator and very rapidly heating it.

Above the generator 10 and spaced therefrom is a reservoir 18, connected to the generator by three pipes 19 20 21. The pipes 19 20 are provided, respectively, with shut-off valves 22 23 between the generator and the reservoir, and the pipe 19 will be extended downward within the generator to a point near its bottom, as at 29, and below the water-line 14, and the intake end of the pipe 20 will terminate at 43 above the water-line, as shown. The pipes 19 and 20 are connected within the chamber 18 by a horizontal branch 44, and leading into this branch, as by a suitable coupling 45, is a feed-pipe 46, the discharge end 47 of the latter extending for some distance into the branch 44, as shown. The reservoir 18 is intended to hold the water for replenishing the generator 10 and will be supplied through an aperture covered by a screw-cap 48, as shown. The reservoir 18 being located above the generator, the water therein will be partially heated by the radiation therefrom, as will be obvious.

By the arrangement of piping and valves shown the steam generated in the shell 10 may be admitted into the branch 44 through the valve 23 and its force utilized to drive the water entering by the feed-pipe 46 through the branch 44 and pipe 19, the valve 22 having of course first been opened. By this means an injector-like action results and insures the positive feeding of the water into the generator and at the same time imparts a large additional degree of heat thereto, so that the temperature of the water in the generator is not materially affected by the introduction of the fresh supply. By properly adjusting the valves 22 23 a continuous uniform supply may be maintained to replace the quantity withdrawn.

The pipe 21 terminates in a safety-valve 50 to prevent undue steam-pressure being generated, and a steam-gage (represented at 51) may also be attached, if required.

Extending laterally through the generator-casing are two pipes 24 25 and provided, respectively, with controlling-valves 26 27, as shown. The pipe 25 is turned upward within the generator and terminates at 28 near its top above the water-line, so that steam will pass through this pipe when the valve 27 is opened, and the pipe 24 is turned downwardly within the generator and terminates at 29 near the bottom and beneath the water-line, so that hot water will be caused to flow from the pipe 24 by the pressure of the steam when the valve 26 is opened. The outer end of the pipe 25 is connected by a detachable steam-tight joint 31 of any approved construction to a casing 32, preferably cylindrical and provided with one or more internal gratings or screens 33 to support the food to be cooked and with a draw-off valve 34 to remove the water of condensation when required. The casing 32 will be provided with a handle 35 to assist in supporting it while being attached and detached. By this simple means any article of food may be easily and quickly placed in the casing 32 and subjected to the action of the steam for any length of time.

The outer end of the pipe 24 terminates in a comparatively elongated, preferably tapered, section 36, suitably perforated and provided with a "union" or other detachable steam and water tight joint 37, by which it is detachably connected to a coffee-receptacle 38, the latter provided with a discharge-valve 39 and a supporting-handle 40, as shown. Within the casing 38 is suspended a coffee-holding screen 41, of any suitable screen material. By this means if the coffee be placed in the receptacle 41 and the casing connected to the pipe 24, as shown, and the valve 26 opened the casing will be quickly charged with hot water from the hottest portion of the mass in the generator—that is to say, nearest the source of heat 15—and the coffee very quickly extracted, and when it has been subjected to the action of the hot water for a sufficient length of time the valve 26 will be closed and the completed decoction drawn off by the valve 39. Then the receptacle 41 can be recharged with the ground coffee and the process repeated, and so on, as often as required. If hot water only is required, it may be drawn from the pipe 24 by first detaching the coffee-generator.

The generator-casing 10 will be provided with a suitable base-support 42 of any approved form and the apparatus inclosed in an ornamental casing of plated metal, if preferred.

The apparatus can be of any desired size or capacity and of any suitable material and employed for any desired purpose, and I do not, therefore, desire to be limited to the use thereof for any specific purpose, but reserve the right to its use for any purpose to which it may be adapted.

While I have illustrated and described the invention in practicable shape, I do not wish to be understood as limiting myself to the precise construction shown, but reserve the right to such modifications and changes as may fall within the scope of the claims.

The members 32 and 38 may be interchanged upon their respective pipe-sections if it is desired to employ hot water instead of steam in the cooker.

Having thus fully described my invention, what I claim is—

1. In an apparatus of the character described, a cooking-chamber, a steam-generator communicating with said cooking-chamber, a supply-reservoir contiguous to said generator, and means for supplying water from the reservoir to the generator, said means comprising a pipe member within the reservoir and having one end extending into the generator where it terminates below the water-line and having the other end extending into the generator where it terminates above the water-line, stop-valves spaced apart and arranged in said pipe member, and a feed-pipe communicating with said pipe member between said stop-valves.

2. In an apparatus of the character described, a cooking-chamber, a steam-generator connected with said cooking-chamber, a water-reservoir, and means for supplying water from said reservoir to the generator, said means comprising a pipe member within said reservoir having a relatively long portion extending into the generator and terminating below the water-line and a relatively short portion extending into said generator and terminating above the water-line, stop-valves in said extending portions of the pipe member, and a feed-pipe extending into said pipe member in advance of the valve in the shorter extending pipe portion.

3. In an apparatus of the character described, a cooking-chamber, a steam-generator connected with said cooking-chamber, a water-reservoir contiguous to said generator, and means for supplying water from said reservoir to said generator, said means comprising a pipe member within said reservoir having its ends within said generator and disposed one above and one below the water-level, stop-valves in said pipe member, and a feed-pipe arranged in said reservoir and extending into said pipe member between said stop-valves.

In testimony that I claim the foregoing as my own I have hereto affixed my signature in the presence of two witnesses.

ROBERT H. GRAY.

Witnesses:
M. DON FORMAN,
WILLIAM WALLACE.